(12) United States Patent
Foss

(10) Patent No.: US 8,289,183 B1
(45) Date of Patent: Oct. 16, 2012

(54) SYSTEM AND METHOD FOR SOLAR PANEL ARRAY ANALYSIS

(75) Inventor: Andrew Foss, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 400 days.

(21) Appl. No.: 12/386,958

(22) Filed: Apr. 24, 2009

Related U.S. Application Data

(60) Provisional application No. 61/047,870, filed on Apr. 25, 2008.

(51) Int. Cl.
*G08B 23/00* (2006.01)
*G08C 15/06* (2006.01)
*H02H 3/20* (2006.01)
*H02H 9/04* (2006.01)

(52) U.S. Cl. .................. 340/870.02; 361/91.1

(58) Field of Classification Search . 340/870.02–870.03
See application file for complete search history.

(56) References Cited

U.S. PATENT DOCUMENTS

| | | | |
|---|---|---|---|
| 3,740,636 A | 6/1973 | Hogrefe et al. |
| 4,129,788 A | 12/1978 | Chavannes |
| 4,189,765 A | 2/1980 | Kotalik et al. |
| 4,280,097 A | 7/1981 | Carey et al. |
| 4,688,538 A | 8/1987 | Ward et al. |
| 4,725,740 A | 2/1988 | Nakata |
| 5,284,719 A | 2/1994 | Landau et al. |
| 5,307,006 A | 4/1994 | Rankin et al. |
| 5,408,404 A | 4/1995 | Mitchell |
| 5,412,308 A | 5/1995 | Brown |
| 5,528,125 A | 6/1996 | Marshall et al. |
| 5,600,247 A | 2/1997 | Matthews |
| 5,604,430 A | 2/1997 | Decker et al. |
| 5,659,465 A | 8/1997 | Flack et al. |
| 5,666,040 A | 9/1997 | Bourbeau |
| 5,669,987 A | 9/1997 | Takehara et al. |
| 5,747,967 A | 5/1998 | Muljadi et al. |
| 5,751,120 A | 5/1998 | Zeltler et al. |
| 5,892,354 A | 4/1999 | Nagao et al. |
| 6,169,678 B1 | 1/2001 | Kondo et al. |
| 6,184,656 B1 | 2/2001 | Karunasiri et al. |

(Continued)

FOREIGN PATENT DOCUMENTS

EP 1 239 573 A1 9/2002

(Continued)

OTHER PUBLICATIONS

"Micropower Synchronous, Buck-Boost DC/DC Converter", MiniLogic Device Corporation, Sep. 2005, p. 1-13.

(Continued)

*Primary Examiner* — Dharti Patel
(74) *Attorney, Agent, or Firm* — Alan A. R. Cooper; Wade James Brady, III; Frederick J. Telecky, Jr.

(57) ABSTRACT

A system and method for monitoring performance of one or more solar panels in a photovoltaic array. The system and method includes a number of sensors are configured to measure an output of individual solar panels. A telemetry gateway collects data from the sensors and transmits the collected data to a monitoring system. The monitoring system includes an event signature recognizer; a trend analyzer; and a symmetry analyzer. The monitoring system detects events, trends and solar panel array asymmetry. Additionally, the monitoring system displays realtime graphs, proposed corrective actions, and alerts via a user interface.

19 Claims, 6 Drawing Sheets

U.S. PATENT DOCUMENTS

| | | | |
|---|---|---|---|
| 6,281,485 B1 | 8/2001 | Siri | |
| 6,311,137 B1 * | 10/2001 | Kurokami et al. | 702/60 |
| 6,331,670 B2 | 12/2001 | Takehara et al. | |
| 6,369,576 B1 | 4/2002 | Matthews et al. | |
| 6,608,404 B2 | 8/2003 | Schienbein et al. | |
| 6,633,823 B2 | 10/2003 | Bartone et al. | |
| 6,636,431 B2 | 10/2003 | Seki et al. | |
| 6,717,519 B1 | 4/2004 | Kobayashi et al. | |
| 6,750,391 B2 | 6/2004 | Bower et al. | |
| 6,844,739 B2 | 1/2005 | Kasai et al. | |
| 6,850,820 B2 | 2/2005 | Tajima | |
| 6,966,184 B2 | 11/2005 | Toyomura et al. | |
| 6,975,522 B2 | 12/2005 | Asano | |
| 6,984,967 B2 | 1/2006 | Notman | |
| 7,046,527 B2 | 5/2006 | West | |
| 7,477,080 B1 | 1/2009 | Fest | |
| 7,566,828 B2 | 7/2009 | Sasaki | |
| 7,605,498 B2 | 10/2009 | Ledenev et al. | |
| 7,701,083 B2 | 4/2010 | Savage | |
| 7,723,865 B2 | 5/2010 | Kitanaka | |
| 7,759,903 B2 | 7/2010 | Kamata | |
| 7,843,085 B2 | 11/2010 | Ledenev et al. | |
| 7,925,552 B2 * | 4/2011 | Tarbell et al. | 705/30 |
| 2002/0038667 A1 | 4/2002 | Kondo et al. | |
| 2003/0201674 A1 | 10/2003 | Droppo et al. | |
| 2004/0135545 A1 | 7/2004 | Fowler et al. | |
| 2005/0105224 A1 * | 5/2005 | Nishi | 361/18 |
| 2005/0257827 A1 | 11/2005 | Gaudiana et al. | |
| 2006/0017327 A1 | 1/2006 | Siri et al. | |
| 2006/0149607 A1 | 7/2006 | Sayers et al. | |
| 2006/0162772 A1 | 7/2006 | Presher, Jr. et al. | |
| 2006/0171182 A1 | 8/2006 | Siri et al. | |
| 2006/0176036 A1 | 8/2006 | Flatness et al. | |
| 2007/0024257 A1 | 2/2007 | Boldo | |
| 2007/0137688 A1 | 6/2007 | Yoshida | |
| 2007/0164612 A1 | 7/2007 | Wendt et al. | |
| 2007/0252716 A1 * | 11/2007 | Burger | 340/635 |
| 2008/0013347 A1 | 1/2008 | Deng et al. | |
| 2008/0087321 A1 | 4/2008 | Schwartzman | |
| 2008/0097655 A1 | 4/2008 | Hadar et al. | |
| 2008/0143188 A1 | 6/2008 | Adest et al. | |
| 2008/0147335 A1 | 6/2008 | Adest et al. | |
| 2008/0150366 A1 | 6/2008 | Adest et al. | |
| 2008/0278983 A1 | 11/2008 | Park | |
| 2009/0039852 A1 | 2/2009 | Fishelov et al. | |
| 2009/0140719 A1 | 6/2009 | Hasenfus | |
| 2009/0242011 A1 | 10/2009 | Proisy et al. | |
| 2009/0283128 A1 | 11/2009 | Zhang et al. | |
| 2009/0283129 A1 | 11/2009 | Foss | |
| 2009/0284078 A1 | 11/2009 | Zhang et al. | |
| 2009/0284232 A1 | 11/2009 | Zhang et al. | |
| 2009/0284240 A1 | 11/2009 | Zhang et al. | |
| 2009/0284998 A1 | 11/2009 | Zhang et al. | |
| 2009/0289502 A1 | 11/2009 | Batarseh et al. | |
| 2010/0001587 A1 | 1/2010 | Casey et al. | |
| 2010/0126550 A1 | 5/2010 | Foss | |
| 2010/0269883 A1 | 10/2010 | Sarhan | |
| 2010/0288327 A1 | 11/2010 | Lisi et al. | |
| 2010/0327659 A1 | 12/2010 | Lisi et al. | |

FOREIGN PATENT DOCUMENTS

| | | |
|---|---|---|
| ES | 2 249 147 B1 | 5/2007 |
| JP | 07-234733 A | 9/1995 |
| JP | 08-123563 A | 5/1996 |
| JP | 08-314555 A | 11/1996 |
| JP | 10014105 A | 1/1998 |
| JP | 10155240 A | 6/1998 |
| JP | 11098679 A | 4/1999 |
| JP | 2000112545 A | 4/2000 |
| JP | 2000116010 A | 4/2000 |
| JP | 2003134661 A | 5/2003 |
| JP | 2003216255 A | 7/2003 |
| JP | 2005-151662 | 6/2005 |
| JP | 2005243852 A | 9/2005 |
| JP | 2005252172 A | 9/2005 |
| JP | 2006134118 A | 5/2006 |
| JP | 2006216660 A | 8/2006 |
| JP | 2006-320149 | 11/2006 |
| JP | 2007-133765 | 5/2007 |
| KR | 100757320 B1 | 9/2007 |
| KR | 20080010116 A | 1/2008 |
| KR | 100886891 B1 | 3/2009 |
| KR | 1020090133036 A | 12/2009 |
| WO | WO 2007/084196 A2 | 7/2007 |

OTHER PUBLICATIONS

Geoffrey R. Walker, et al., "Cascaded DC-DC Converter Connection of Photovoltaic Modules", IEEE Transactions on Power Electronics, vol. 19, No. 4, Jul. 2004, pp. 1130-1139.

"PV FAQs", U.S. Department on Energy, Jan. 2004, 2 pages.

"Perspectives of Concentrating Solar Power", Renewable Energy India 2008 Expo, Aug. 22, 2008, 16 pages.

"APEC 2008, 23rd Annual Applied Power Electronics Conference and Exposition", vol. 1, Seminars 1-6, Feb. 24-28, 2008, Austin, Texas, 89 pages.

Yunwei Li, et al., "Design, Analysis, and Real-Time Testing of a Controller for Multibus Microgrid System", IEEE Transactions on Power Electronics, vol. 19, No. 5, Sep. 2004, p. 1195-1204.

R.H. Lasseter, "MicroGrids", 2002 IEEE Power Engineering Society Winter Meeting, vol. 1, Jan. 2002, p. 305-308.

John Stevens, "Development of Sources and a Testbed for CERTS Microgrid Testing", 2004 IEEE Power Engineering Society General Meeting, Jun. 2004, p. 1-2.

Mike Barnes, et al., "Real-World MicroGrids—An Overview", 2007 IEEE SoSE International Conference, Apr. 2007, p. 1-8.

Paolo Piagi, et al., "Autonomous Control of Microgrids", IEEE Power Engineering Society General Meeting, Jun. 2006, 8 pages.

Y. Zoka, et al., "An Interaction Problem of Distributed Generators Installed in a MicroGrid", 2004 IEEE International Conference on Electric Utility Deregulation, Restructuring and Power Technologies (DRPT2004), Apr. 2004, Hong Kong, p. 795-799.

M.P.F. Hommelberg, et al., "Distributed Control Concepts using Multi-Agent technology and Automatic Markets: An indispensable feature of smart power grids", 2007 IEEE Power Engineering Society General Meeting, Jun. 2007, p. 1-7.

Notification of Transmittal of the International Search Report and the Written Opinion of the International Searching Authority, or the Declaration dated Dec. 17, 2009 in connection with PCT Application No. PCT/US2009/044033.

Guo Heng, et al., "A Novel Maximum Power Point Tracking Strategy for Stand-along Solar Pumping Systems", 2005 IEEE, 5 pages.

Debosmita Das, et al., "An Optimal Design of a Grid Connected Hybrid Wind/Photovoltaic/Fuel Cell System for Distributed Energy Production", 2005 IEEE, p. 2499-2504.

Claus Bjerge, et al., "How to run an offshore wind farm like a conventional power plant", www.modernpowersystems.com, Jan. 2007, 4 pages.

Steven Anderson, "Remote . . . But Not Economically Out of Reach", Power and Energy, Dec. 15, 1986, 5 pages.

Qihi Liu, et al., "Novel Modeling and Control of Doubly-Fed Variable-Speed Constant-Frequency Wind Power Generator", The 33rd Annual Conference of the IEEE Industrial Electronics Society (IECON), Nov. 5-8, 2007, p. 1621-1626.

Casisheng Wang, "Modeling and Control of Hybrid Wind/Photovoltaic/Fuel Cell Distributed Generation Systems", Jul. 2006, Montana State University, 403 pages.

Notification of Transmittal of the International Search Report and the Written Opinion of the International Searching Authority, or the Declaration dated Dec. 23, 2009 in connection with International Patent Application No. PCT/US2009/044036.

Jianhui Zhang, et al., "Active Cell and Module Balancing for Batteries or Other Power Supplies", U.S. Appl. No. 12/882,781, filed Sep. 15, 2010.

Ramesh Khanna, "Solar-Powered Battery Charger and Related System and Method", U.S. Appl. No. 12/589,984, filed Oct. 30, 2009.

Notification of Transmittal of the International Search Report and the Written Opinion of the International Searching Authority, or the Declaration dated Jan. 13, 2011 in connection with PCT Application No. PCT/US2010/034783.

Gianpaolo Lisi, et al., "Off-Grid LED Street Lighting System With Multiple Panel-Storage Matching", U.S. Appl. No. 12/925,110, filed Oct. 14, 2010.

Notification of Transmittal of the International Search Report and the Written Opinion of the International Searching Authority, or the Declaration dated Dec. 24, 2009 in connection with International Patent Application No. PCT/US2009/044019.

Carlos Meza, et al., "Boost-Buck inverter variable structure control for grid-connected photovoltaic systems", 2005 IEEE, p. 1318-1321.

Mikihiko Matsui, et al., "A New Maximum Photovoltaic Power Tracking Control Scheme Based on Power Equilibrium at DC Link", 1999 IEEE, p. 804-809.

Notification of Transmittal of the International Search Report and the Written Opinion of the International Searching Authority, or the Declaration dated Dec. 23, 2009 in connection with PCT Application No. PCT/US2009/044027.

Notification of Transmittal of the International Search Report and the Written Opinion of the International Searching Authority, or the Declaration dated Dec. 23, 2009 in connection with PCT Application No. PCT/US2009/044015.

Jianhui Zhang, et al., "Method and System for Providing Central Control in a Energy Generating System", U.S. Appl. No. 12/152,479, filed May 14, 2008.

Stephen W. Moore, et al., "A Review of Cell Equalization Methods for Lithium Ion and Lithium Polymer Battery Systems", Society of Automotive Engineers, Inc., 2001, 5 pages.

Sihua Wen, "Cell balancing buys extra run time and battery life", Analog Applications Journal, 2009, 8 pages.

"Five to Ten Series Cell Lithium-Ion or Lithium-Polymer battery Protector and Analog Front End", Texas Instruments, Jun. 2008, 60 pages.

"Li-Ion, NiMH Battery Measuring, Charge Balancing and Power-supply Circuit", Atmel Corporation, Oct. 2009, 55 pages.

Werner Rößler, "Boost battery performance with active charge-balancing", EE Times—Asia, Jul. 16-31, 2008, p. 1-3.

Notification of Transmittal of the International Search Report and the Written Opinion of the International Searching Authority, or the Declaration dated Dec. 31, 2010 in connection with PCT Application No. PCT/US2010/031462.

Notification of Transmittal of the International Search Report and the Written Opinion of the International Searching Authority, or the Declaration dated Jan. 3, 2011 in connection with PCT Application No. PCT/US2010/031505.

Office Action dated Jan. 25, 2012 in connection with U.S. Appl. No. 12/454,136.

Office Action dated Dec. 30, 2011 in connection with U.S. Appl. No. 12/456,776.

Office Action dated Dec. 9, 2011 in connection with U.S. Appl. No. 12/454,244.

Office Action dated Nov. 25, 2011 in connection with U.S. Appl. No. 12/272,990.

Office Action dated Sep. 21, 2011 in connection with U.S. Appl. No. 12/456,777.

* cited by examiner

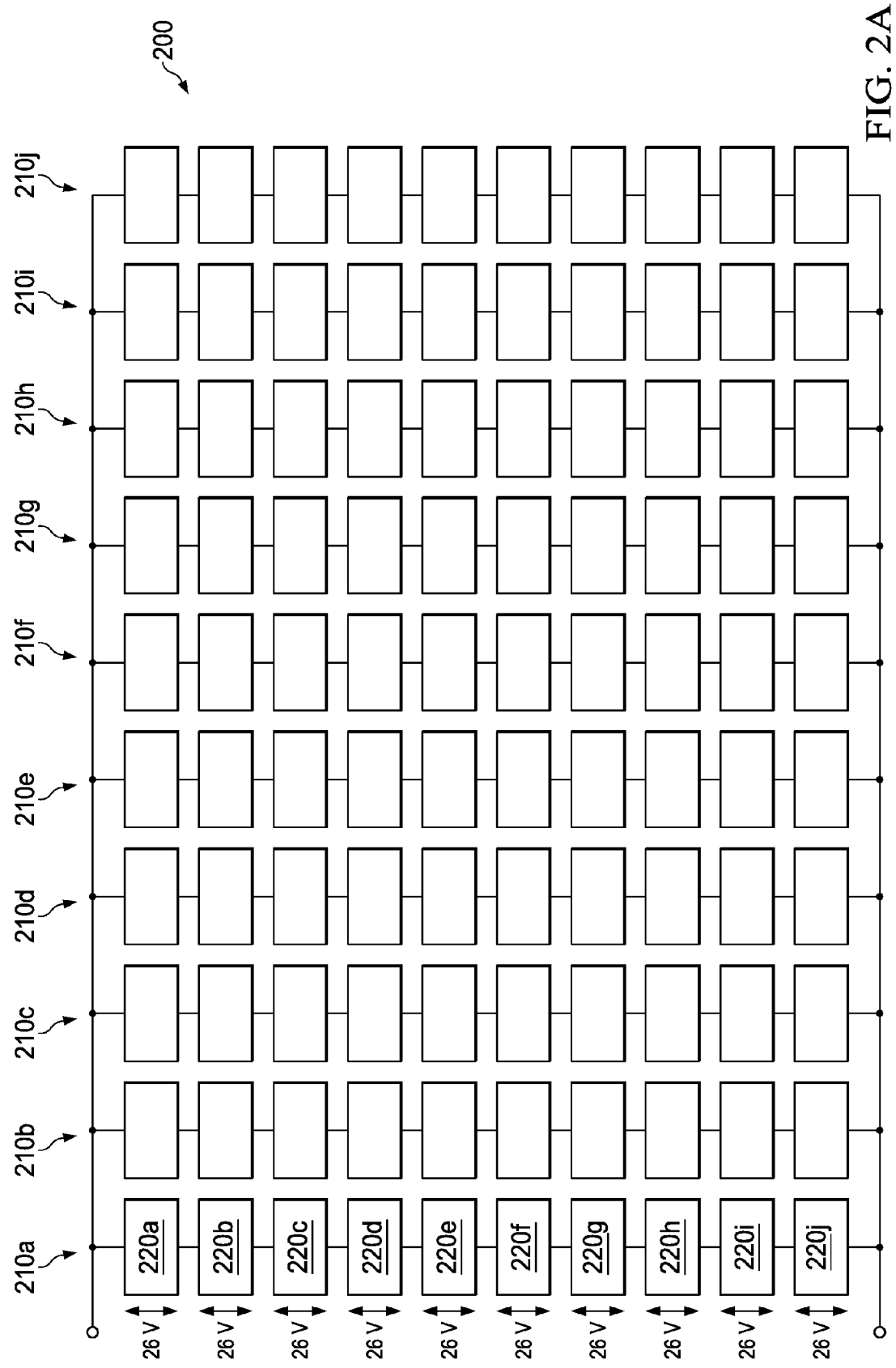

SYSTEM AND METHOD FOR SOLAR PANEL ARRAY ANALYSIS

CROSS-REFERENCE TO RELATED APPLICATION(S) AND CLAIM OF PRIORITY

The present application is related to U.S. Provisional Patent No. 61/047,870, filed Apr. 25, 2008, entitled "SOLAR ARRAY ANALYSIS SYSTEM". The present application hereby claims priority under 35 U.S.C. §119(e) to U.S. Provisional Patent No. 61/047,870.

TECHNICAL FIELD OF THE INVENTION

The present application relates generally to electrical power systems and, more specifically, to a system and method for monitoring system performance of a solar-cell power array.

BACKGROUND OF THE INVENTION

Photovoltaic (PV) panels (here also referred to as solar panels) use radiant light from the sun to produce electrical energy. The solar panels include a number of PV cells to convert the sunlight into the electrical energy. The majority of solar panels use wafer-based crystalline silicon cells or a thin-film cell based on cadmium telluride or silicon. Crystalline silicon, which is commonly used in the wafer form in PV cells, is derived from silicon, a commonly used semi-conductor. PV cells are semiconductor devices that convert light directly into energy. When light shines on a PV cell, a voltage develops across the cell, and when connected to a load, a current flows through the cell. The voltage and current vary with several factors, including the physical size of the cell, the amount of light shining on the cell, the temperature of the cell, and external factors.

A solar panel (also referred to as PV module) is made of PV cells arranged in series and parallel. For example, the PV cells are first coupled in series within a group. Then, a number of the groups are coupled together in parallel. Likewise a PV array (also referred to as solar array) is made of solar panels arranged in series and in parallel. Two or more PV arrays located in physical proximity to each other are referred to as a PV array site.

The electrical power generated by each solar panel is determined by the solar panel's voltage and current. In a solar array electrical connections are made in series to achieve a desired output string voltage and/or in parallel to provide a desired amount of string current source capability. In some cases, each panel voltage is boosted or bucked with a DC-DC converter.

The solar array is connected to an electrical load, an electrical grid or an electrical power storage device, such as, but not limited to, battery cells. The solar panels deliver Direct Current (DC) electrical power. When the electrical load, electrical grid or electrical power storage device operates using an Alternating Current (AC), (for example, sixty cycles per second or 60 Herz (Hz)), the solar array is connected to the electrical load, electrical grid, or electrical power storage device, through a DC-AC inverter Solar panels exhibit voltage and current characteristics described by their I-V curve. When the solar cells are not connected to a load, the voltage across their terminals is their open circuit voltage, $V_{oc}$. When the terminals are connected together to form a short circuit, a short circuit current, $I_{sc}$, is generated. In both cases, since power is given by voltage multiplied by current, no power is generated. A Maximum Power Point (MPP) defines a point wherein the solar panels are operating at a maximum power.

In a conventional solar array, all of the individual panels in the array must receive full sunlight for the array to work properly. If a portion of the array is shaded or otherwise impaired, the entire array power output—even from those sections still exposed to sunlight—is lowered. Inevitably, efficiency reducing variations among panels exist in many solar arrays. A significant amount of energy is left unrealized when these variations go undetected and uncorrected.

SUMMARY OF THE INVENTION

A solar panel array for use in a solar cell power system is provided. The solar panel array includes a number of solar panels. The solar panel array includes a number of sensors configured to measure an output of each of the number of solar panels. A telemetry gateway collects data from the sensors and transmits the collected data to a monitoring system. The monitoring system includes an event signature recognizer; a trend analyzer; and a symmetry analyzer. The monitoring system detects events, trends and solar panel array asymmetry. Additionally, the monitoring system displays operator system status information via a user interface.

A device for use in a solar cell power system is provided. The device includes an event signature recognizer, a trend analyzer, and a symmetry analyzer. The monitoring system is configured to receive data from a telemetry device located at a solar cell site via a network connection. Additionally, the monitoring system uses the data to detect events, trends and solar panel array asymmetry and displays operator system status information via a user interface.

A method of monitoring solar cell performance in a photovoltaic array is provided. The method includes receiving, by a telemetry device, a data corresponding to a monitored voltage of at least one solar panel in the photovoltaic array. The data is sent to a monitoring system. The monitoring system includes an event signature recognizer, a trend analyzer, and a symmetry analyzer. The monitoring system provides results to a user of at least one event signature analysis, trend analysis and symmetry analysis.

Before undertaking the DETAILED DESCRIPTION OF THE INVENTION below, it may be advantageous to set forth definitions of certain words and phrases used throughout this patent document. The term "packet" refers to any information-bearing communication signal, regardless of the format used for a particular communication signal. The terms "application," "program," and "routine" refer to one or more computer programs, sets of instructions, procedures, functions, objects, classes, instances, or related data adapted for implementation in a suitable computer language. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 2A-2C illustrates example schematic diagrams for a solar array according to embodiments of the present disclosure;

DETAILED DESCRIPTION OF THE INVENTION

FIGS. 1 through 5D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged photovoltaic array system.

Embodiments of the present disclosure provide a system for improving the efficiency of PV array systems. High-resolution monitoring devices and diagnostic tools are utilized to extract improved performance from PV arrays. A PV array may include a number of individual panels. For example and not limitation, a PV array can include ten individual panels, a hundred individual panes, or thousands of individual panels. Embodiments of the present disclosure provide for data to be collected from each of those panels to be used to optimize the power output of the entire PV array over its lifetime. The ability to maintain an array at maximum power efficiency significantly increases the PV array's energy generation potential. A small degradation in the performance of one panel out of many in a PV array can impair the performance of the entire PV array.

Operating the PV array system efficiently is based upon receiving information regarding what is happening within the system at the level of individual solar panels. Receiving information on a panel-by-panel basis enables an operator to know whether or not a system is operating at peak efficiency, or if it is not, why the system is not operating at peak efficiency.

Embodiments of the present disclosure provide for more timely diagnosis of inefficiencies and lost generation capacity of the PV array. A PV array monitoring system identifies inefficiencies and lost generation capacity by sensing voltages generated by individual solar panels. The PV array monitoring system analyzes data collected by digital voltage sensors. The PV array monitoring system is operable to recognize trends and events affecting a PV array. The PV array monitoring system displays results to an operator in the form of graphs, reports and alerts.

Figure 1:
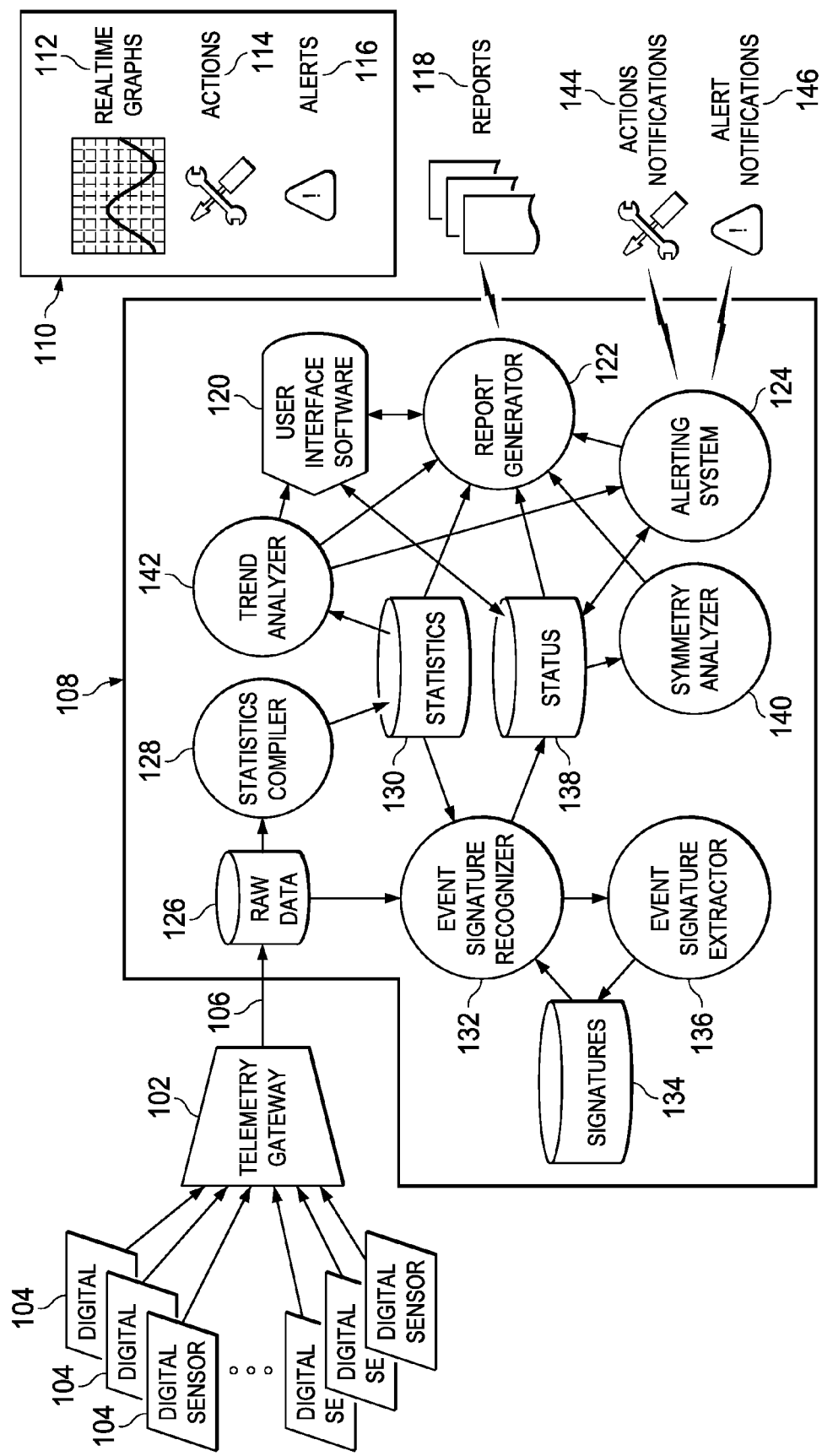
FIG. 1 illustrates a PV array monitoring system according to embodiments of the present disclosure.

FIG. 1 illustrates a PV array monitoring system according to embodiments of the present disclosure. The embodiment of the PV array monitoring system shown in FIG. 1 is for illustration only. Other embodiments of the PV array monitoring system could be used without departing from the scope of this disclosure.

The PV array monitoring system 100 includes a Telemetry Gateway Device (TGD) 102 coupled to a number of sensors 104. The TGD 102 receives data from each of the sensors 104. In some embodiments, each string of panels includes a TGD 102. In additional and alternative embodiments, a PV array site includes one or more TGDs 102. The sensors 104 can be digital sensors as disclosed in U.S. patent application Ser. No. 12/403,339 filed on Mar. 12, 2009 entitled APPARATUS AND METHODS FOR MANAGING OUTPUT POWER OF STRINGS OF SOLAR CELLS, the contents of which are hereby incorporated by reference in their entirety. In some embodiments, each solar panel is coupled to a sensor 104. In some embodiments, each sensor 104 is coupled to more than one solar panel. In yet additional and alternative embodiments, each sensor is coupled to a string of solar panels.

The TGD 102 also is coupled via a network connection 106 to a System Monitoring Station (SMS) 108. The network connection 106 can be a wireline or wireless internet connection. In some embodiments, the SMS 108 is a computer system or server configured to perform a number of system analysis processes. The SMS 108 is configured to provide operator system status information 110. The operator system status information includes realtime graphs 112, proposed corrective actions 114, alerts 116 and reports 118.

In some embodiments, the SMS 108 provides the operator system status information 110 via a user interface 120. The user interface 120 is coupled to a report generator 122 and an alerting system 124. Accordingly, the SMS 108 is configured to provide a user (e.g., operator) with many kinds of information related to the operation of the PV array.

The SMS 108 receives data collected by the sensors 104 via the TGD 102 and network connection 106. The TGD 102 transmits data collected from sensors 104 coupled to the TGD 102. It will be understood that illustration of a single TGD 102 transmitting data is for example purposes only and the system can include more than one TGD 102 coupled to one or more SMS's 108. The SMS 108 stores the received data in a raw data database 126. A statistics compiler 128 processes the received data and computes statistics regarding the received data. The statistics compiler 128 stores the computed statistics in a statistics database 130.

An event signature recognizer processor 132 analyses the received data and computed statistics to identify event signatures. Event signatures are indicators that one or more efficiency reduction events have occurred on one more PV cells and/or PV panels. An event signature recognizer 132 compares the received data, computed statistics and known signatures stored in a signature database 134. An event signature extractor 136 extracts the event signature from the event signature recognizer 132 and stores the event signature in the signature database 136. Additionally, the event signature recognizer 132 stores a change in status of the sensor 104 in a status database 138.

Thereafter, a symmetry analyzer 140 analyzes the status data stored in the status database 138. Additionally, a trend analyzer 142 analyzes the computed statistics to identify trends (discussed in further detail herein below with respect to FIG. 5) in the data received from the respective sensors 104.

The user interface 120, report generator 122 and alerting system 124 each also access the statistics database 130 and status database 140 as well as the symmetry analyzer 140 and trend analyzer 142. The user interface 120 provides visual realtime graphs 112, proposed corrective actions 114 and alerts 116. The report generator 122 generates customized reports 118. Further, the alerting system 124 provides proposed actions notifications 144 and alert notifications 146.

The PV array monitoring system 100 provides operation information regarding signatures of short-lived events, trends associated with longer duration changes in array performance, symmetry analysis (a detailed example illustrated herein below), efficiency and cost analysis.

The sensors 104 measure voltages generated by individual panels in the PV array. The PV array monitoring system utilizes measurements of the outputs of subsections that make up the PV array rather than the PV array as a whole. The sensors 104 communicate raw data to the statistics compiler 128 and the event signature recognizer 132 through the TGD 102 and raw data database 126. For example, the sensors 104 communicate with the statistics compiler 128 and event signature recognizer 132 via wired or wireless internet connections. The statistics compiler 128 and event signature recognizer 132 coordinate operations with the trend analyzer 142, symmetry analyzer 140 and the event signature extractor 136 to generate statistics, status, and signature information pertaining to the PV array. The results of these operations are communicated to a user via an interactive computer user interface 120, reports 118, and/or alerts 116.

Figure 2B:
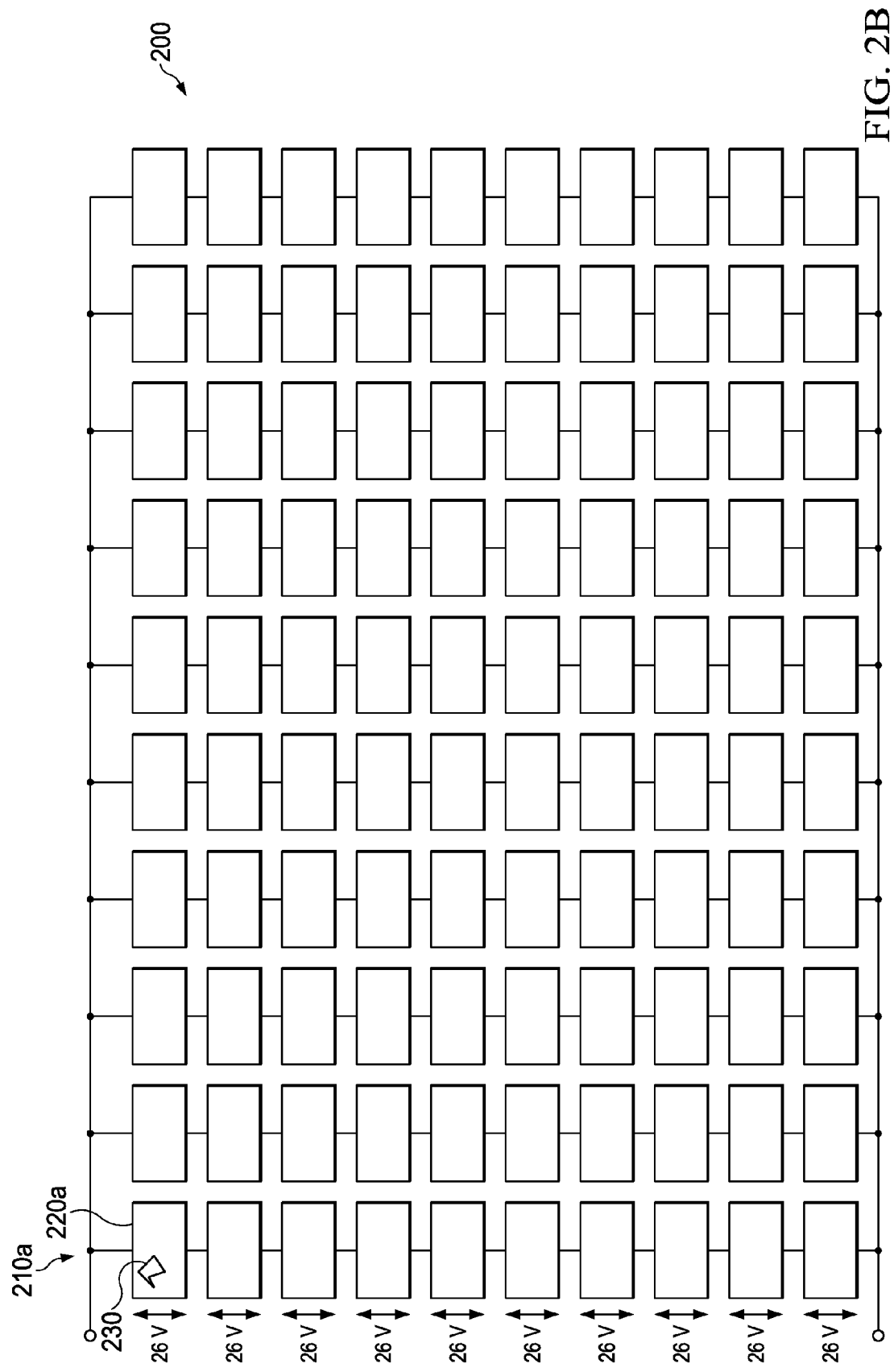
Figure 2C:
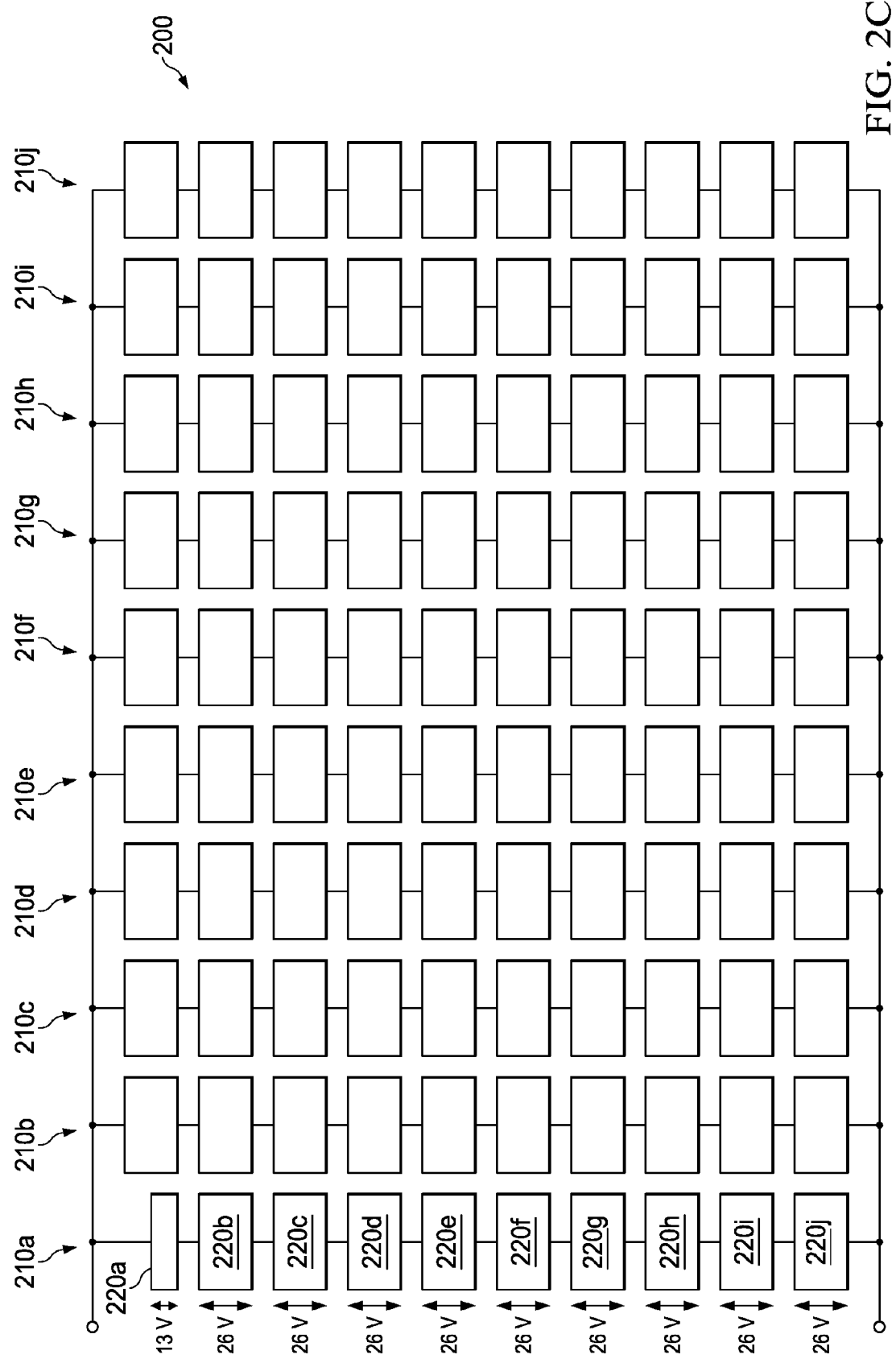

FIGS. 2A-2C illustrates example schematic diagrams for a solar array according to embodiments of the present disclosure. The embodiments of the schematic diagrams shown in FIGS. 2A-2C are for illustration only. Other embodiments could be used without departing from the scope of this disclosure.

The PV array monitoring system 100 provides knowledge of the operating parameters at the solar panel level. For example, FIGS. 2A-2C illustrate the effect of deterioration in performance of part of a single solar panel in a PV array containing multiple solar panels.

FIG. 2A illustrates a PV array 200 that includes ten (10) strings 210a-210j of ten (10) solar panels 220a-220j. The panels 220 in each string 210 are wired in series. The strings 210 of panels 210 are wired in parallel. It will be understood that illustration of ten strings including ten solar panels each is for example purpose only and embodiments with different numbers of strings and different numbers of solar panels per string could be used without departing from the scope of this disclosure.

In one example, the voltage corresponding to the MPP for each panel is 26.3 volts (V). At 26.3 V, the corresponding current is 7.6 amps (A). Ten panels 220 in series in a string 210 generate 263 volts. At 7.6 A, each string 210 produces nearly 2,000 watts (W) and the PV array 200 produces 20 kilowatts (kW).

FIG. 2B illustrates the effect of a problem in one panel 220a of one string 210a. Part of the panel 220a could be obstructed by debris 230, such as, but not limited to, dirt or leaves, or the solar panel 220a may temporarily lie in a shadow, or be disabled by some other event. In one example, each panel 220 contains fifty-four (54) cells (not specifically illustrated). In such example, one cell is obscured or disabled. Accordingly, in terms of the 20 kW PV array 200, only about point zero two percent (0.02%) of the power generating area is affected. However, due to the way cells are wired within the panel 220, a problem in one cell can cause bypass diodes (not illustrated) to effectively shut down half of the cells in the panel 220.

FIG. 2C illustrates the effect of turning off half of one panel 220a in one string 210a. When one half of one panel 220a in one string 210 of the PV array 200 is turned off, the remaining half (½) panel 220a and nine (9) other panels 220b-220j in the string 210a still operate at 263 V since the string 210a is wired in parallel with the nine other strings 210b-210j in the PV array 200. However, 263 V divided by 9% panels means that each panel 220a-220j in string 210a must now operate at 27.7 V instead of 26.3 V.

Figure 3:
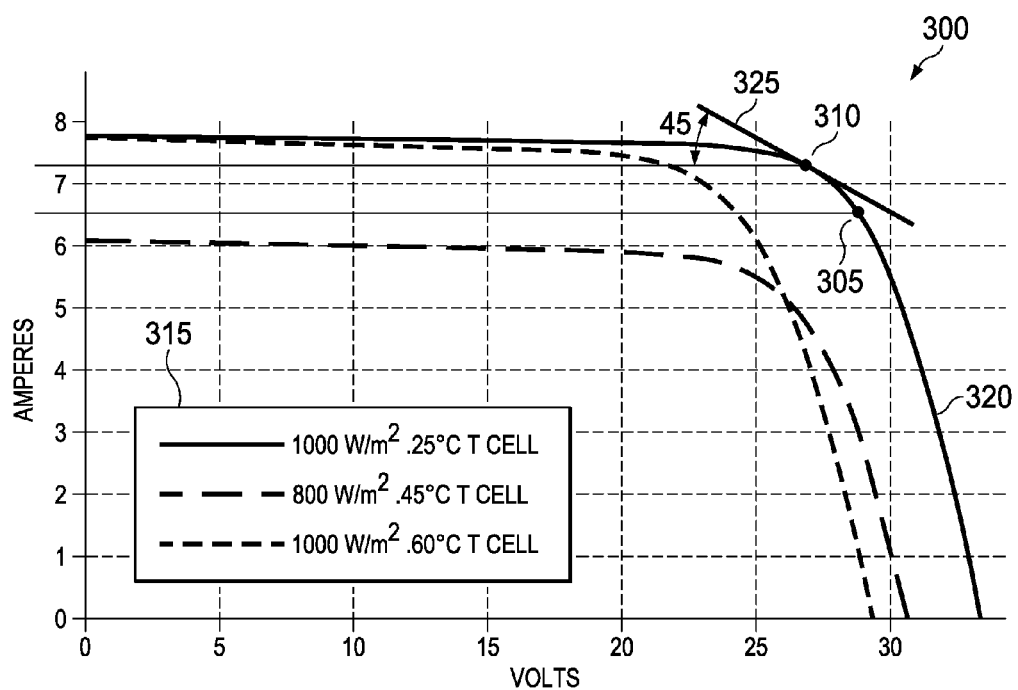
FIG. 3 illustrates an example I-V curve for a photovoltaic panel according to embodiments of the present disclosure.

FIG. 3 illustrates an example I-V curve for a photovoltaic panel according to embodiments of the present disclosure. The embodiment of the I-V curve 300 shown in FIG. 3 is for illustration only. Other embodiments of the I-V curve 300 could be used without departing from the scope of this disclosure.

As shown in the I-V curve 300, at 27.7 V each panel 220 produces 6.4 A. Multiplying 6.4 A by the string voltage (e.g., 263 V) yields the power generated (shown at point 305) by the string (e.g., 1683 W). The power generated at 27.7 V (e.g., point 305) is 16% less power than what is generated when the string 210 operates at its MPP (shown at point 310). Therefore, the overall power generating capacity of the 20 kW PV array 200 has been reduced by 1.5% to 19,683 W. Thus, a 0.02% reduction in generating area results in a 1.5% reduction in power generating capacity. Accordingly, the effect of disabling one cell in five thousand four hundred (5,400) has been multiplied by a factor of seventy-five (75).

In the I-V curve 300, the solid line 315 indicates performance for one kilowatt per meter squared (1 kW/m2) of sunlight falling on a cell operating at a temperature of twenty five Celsius (25C). The shape of the power curve 320 implies that there is one voltage and current combination at which a solar panel generates maximum power, referred to as the MPP 310. The MPP 310 is the point at which the power curve 320 is tangent to a forty-five degree (45°) line 325. Whenever a solar panel 220 operates away from the MPP 310, the solar panel 220 is operating at less than maximum efficiency. When one panel 220a in a PV array 200 operates away from the one panel's 220a MPP 310, the one solar panel 220a causes other panels 220b-220j to deviate from their respective MPPs 310 as well. Therefore, a problem in one panel 220a can hurt the efficiency of other panels 220b-220j that have, or are experiencing, no negative events.

Symmetry refers to the sensitivity of solar arrays to small problems in individual panels that are connected to a common inverter. Asymmetry in a solar array causes the entire array to operate at reduced efficiency.

In some embodiments, the effects of a single panel 220a negatively affecting the efficiency of the entire PV array 200 are avoided by providing a separate inverter for each string 210 of panels 220 in the PV array 200 rather than using just one inverter for the entire PV array 200. Therefore, the effect of the degradation illustrated in the above example can be minimized when each string 210 in the PV array 200 is serviced by its own inverter.

Figure 4:
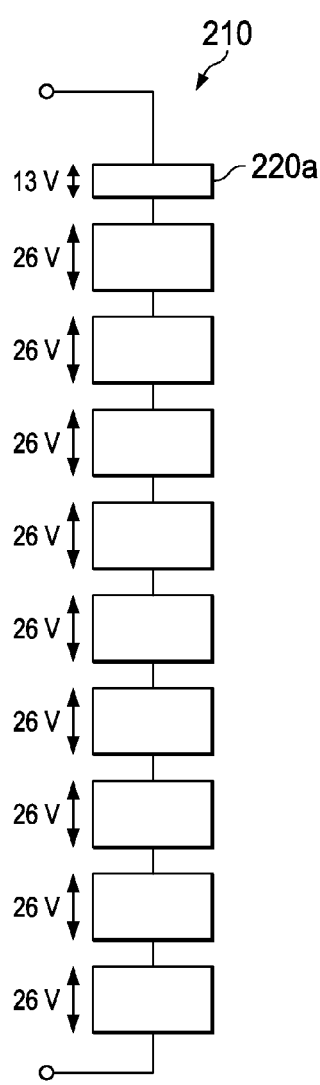
FIG. 4 illustrates a schematic diagram for a string of solar panels according to embodiments of the present disclosure.

FIG. 4 illustrates a schematic diagram for a string of solar panels according to embodiments of the present disclosure. The embodiment of the string 210 of panels 220 shown in FIG. 4 is for illustration only. Other embodiments of the string 210 could be used without departing from the scope of this disclosure.

When one half of one panel 220 in the string 210 is shut down, that panel's output drops by 13 V. Therefore, the output of the string 210 now is 250 V. The string 210 is not forced to remain at 263 V because the string 210 is not connected in parallel with other 263 V strings. Instead, the string 210 is connected to its own inverter (not shown). Each panel 220 in the string 210 still operates at 26.3 V per panel and 7.6 A. Therefore the output of the string 210 is 1,900 W or five percent (5%) less than normal.

In embodiments, the PV array 200 includes ten (10) inverters such that each string 210 is coupled to a respective inverter (e.g., one inverter for each string 210). Accordingly, the strings 210 are not forced to operate at the same voltage. In the event an obstruction occurs in a cell of one panel 220a, then a 0.5% reduction in array output would result rather than 1.5%.

In some embodiments, the PV array monitoring system 100 is used with a PV array 200 that includes multiple inverters (e.g., one inverter per string 210). The sensors 104 on each solar panel 220, or on each string 210, provided detailed information on the health of the PV array 200. Inverters on each string 210 draw power at maximum efficiency by responding to variations across an array that cannot be accommodated by a system including only one inverter.

FIGS. 5A-5D illustrates example solar panel event signatures according to embodiments of the present disclosure. The embodiments of the signatures shown in FIGS. 5A-5D are for illustration only. Other embodiments of the signatures could be used without departing from the scope of this disclosure.

The PV array monitoring system 100 further provides analysis of trends, signatures and system efficiency as well as other information. FIGS. 5A-5D illustrate plots of power generated by a solar panel 220 versus time. Signatures are events that are short lived while trends are events that take place over longer periods of time.

Figure 5A:
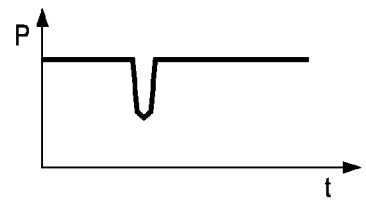
FIGS. 5A-5D illustrates example solar panel event signatures according to embodiments of the present disclosure.
Figure 5B:
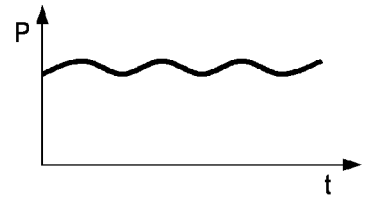
Figure 5C:
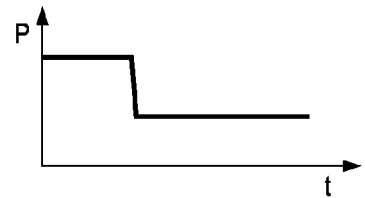
Figure 5D:

FIG. 5A illustrates a signature corresponding to a temporary dip in power generated by a solar panel 220. For example, the dip might be caused by a passing shadow. FIG. 5B illustrates a periodic change in power such as might occur from shading on a once-per-day cycle. FIG. 5C illustrates a signature of a permanent obstruction such as, but not limited to, dirt, debris, or damage to a cell. FIG. 5D illustrates a trend of decreasing power that could be associated with effects such as corrosion of connectors or increases in bypass diode temperature.

It will be understood that FIGS. 5A-5D are provided for example only and other signatures are possible in addition to those shown in FIGS. 5A-5D. For example, the signature of a panel that has been stolen can be represented as its power output abruptly goes to zero. Additionally, more advanced is trend analysis of power generated by a panel versus sunlight energy available as measured by a pyronometer located near the panel. This trend can be used to predict array performance in the future. Trend analysis may also be used to predict failures of panels, inverters or other components of a solar array.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A solar panel array for use in a solar cell power system, the solar panel array comprising:
    a number of solar panels configured in a plurality of strings;
    a number of sensors configured to measure an output of each of the solar panels;
    a plurality of inverters connected to solar panels in the solar array, each inverter coupled to its own string of the plurality of strings, wherein each string can operate at its own voltage,
    wherein the sensors are further configured to measure output power of at least one of the inverters of the plurality of inverters;
    a telemetry gateway configured to collect data from the sensors and transmit the collected data; and
    a monitoring system configured to receive the collected data, the monitoring system comprising:
        an event signature recognizer,
        a trend analyzer, and
        a symmetry analyzer,
        wherein the monitoring system is configured to detect events, trends and solar panel array asymmetry and to display operator system status information via a user interface.

2. The solar panel array as set forth in claim 1, the monitoring system further comprising a report generator and an alerting system.

3. The solar panel array as set forth in claim 2, wherein the alerting system is configured to provide alert notifications and proposed action notifications.

4. The solar panel array as set forth in claim 1, wherein the operator system status information includes at least one of realtime graphs, proposed corrective actions, and alerts.

5. The solar panel array as set forth in claim 1, wherein the sensors are configured to measure at least one of a voltage, a current, and a temperature.

6. The solar panel array as set forth in claim 1, wherein the events are temporary obstructions, periodic obstructions, or permanent obstructions of a solar panel array component and the trends are power degradations of the solar panel array component.

7. A device for use in a solar cell power system, the device comprising:
    an event signature recognizer;
    a trend analyzer; and
    a symmetry analyzer;
    wherein the device is configured to receive data from a telemetry device located at a solar cell site via a network connection, the device further configured to use the data to detect events, trends and solar panel array asymmetry and to display operator system status information via a user interface,
    the telemetry device associated with:
        a number of solar panels configured in a plurality of strings;
        a number of sensors configured to measure an output of each of the solar panels; and
        a plurality of inverters connected to solar panels in the solar array, each inverter coupled to its own string of the plurality of strings, wherein each string can operate at its own voltage,
        wherein the sensors are further configured to measure output power of at least one of the inverters of the plurality of inverters.

8. The device as set forth in claim 7, further comprising a report generator and an alerting system.

9. The device as set forth in claim 8, wherein the alerting system is configured to provide alert notifications and proposed action notifications.

10. The device as set forth in claim 7, wherein the operator system status information includes at least one of realtime graphs, proposed corrective actions, and alerts.

11. The device as set forth in claim 7, wherein the data includes measurements of at least one of a voltage, a current, and a temperature for at least one solar panel.

12. The device as set forth in claim 7, wherein the network connection is one of a wireless connection and a wireline connection.

13. The device as set forth in claim 7, wherein the events are temporary obstructions, periodic obstructions, or permanent obstructions of a solar panel array component and the trends are power degradations of the solar panel array component.

14. A method for monitoring solar cell performance in a photovoltaic array, the method comprising:
- receiving, from a telemetry device, data corresponding to a monitored voltage of at least one solar panel in the photovoltaic array at a monitoring system, the monitoring system comprising:
  - an event signature recognizer,
  - a trend analyzer, and
  - a symmetry analyzer; and
- providing results to a user of at least one event signature analysis, trend analysis and symmetry analysis
- the telemetry device associated with:
  - a number of solar panels configured in a plurality of strings;
  - a number of sensors configured to measure an output of each of the solar panels; and
  - a plurality of inverters connected to solar panels in the solar array, each inverter coupled to its own string of the plurality of strings, wherein each string can operate at its own voltage,
  - wherein the sensors are further configured to measure output power of at least one of the inverters of the plurality of inverters.

15. The method set forth in claim 14, the monitoring system further comprising a report generator and an alerting system.

16. The method as set forth in claim 15, further comprising alert notifications and proposed action notifications.

17. The method as set forth in claim 14, wherein the data includes measurements of at least one of a voltage, a current, and a temperature for at least one solar panel.

18. The method as set forth in claim 15, wherein receiving the data comprises receiving the data via a network connection, and wherein the network connection is one of a wireless connection and a wireline connection.

19. The method as set forth in claim 14, wherein the events are temporary obstructions, periodic obstructions, or permanent obstructions of one or more solar panel array components and the trends are power degradations of one or more solar panel array components.

* * * * *